(12) United States Patent
Guering

(10) Patent No.: US 9,545,992 B2
(45) Date of Patent: Jan. 17, 2017

(54) HIGH-LIFT TRAILING EDGE FLAP SYSTEM FOR AN AIRCRAFT WING UNIT

(71) Applicant: AIRBUS OPERATIONS S.A.S., Toulouse (FR)

(72) Inventor: Bernard Guering, Montrabe (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 1 day.

(21) Appl. No.: 14/499,549

(22) Filed: Sep. 29, 2014

(65) Prior Publication Data
US 2015/0090843 A1 Apr. 2, 2015

(30) Foreign Application Priority Data
Sep. 30, 2013 (FR) .................................... 13 59393

(51) Int. Cl.
| | |
|---|---|
| B64C 3/50 | (2006.01) |
| B64C 13/24 | (2006.01) |
| B64C 13/28 | (2006.01) |
| B64C 13/40 | (2006.01) |
| B64C 13/50 | (2006.01) |
| B64C 9/02 | (2006.01) |
| B64C 9/06 | (2006.01) |
| B64C 9/16 | (2006.01) |

(52) U.S. Cl.
CPC . *B64C 3/50* (2013.01); *B64C 9/02* (2013.01); *B64C 9/06* (2013.01); *B64C 9/16* (2013.01); *B64C 13/24* (2013.01); *B64C 13/28* (2013.01); *B64C 13/40* (2013.01); *B64C 13/50* (2013.01); *B64C 2013/506* (2013.01); *Y02T 50/32* (2013.01)

(58) Field of Classification Search
CPC ................ B64C 3/50; B64C 9/02; B64C 9/06; B64C 9/16; B64C 13/24; B64C 13/28; B64C 13/40; B64C 13/50
USPC .................................. 244/211–217, 131, 99.3
See application file for complete search history.

(56) References Cited

U.S. PATENT DOCUMENTS

| | | | | |
|---|---|---|---|---|
| 1,917,428 A | * | 7/1933 | Burnelli .................... | B64C 9/28 244/214 |
| 3,244,384 A | | 4/1966 | Bracka et al. | |
| 3,655,149 A | * | 4/1972 | Williams .................. | B64C 9/18 244/225 |
| 3,785,594 A | * | 1/1974 | Lee ........................... | B64C 9/16 244/216 |
| 4,049,219 A | * | 9/1977 | Dean ........................ | B64C 9/20 244/217 |
| 4,471,928 A | * | 9/1984 | Cole ......................... | B64C 9/00 244/215 |

(Continued)

FOREIGN PATENT DOCUMENTS

GB   2260521 A   10/1991

OTHER PUBLICATIONS

French Patent and Trademark Office, French Search Report for Application No. 1359393 mailed Jun. 26, 2014.

*Primary Examiner* — Brian M O'Hara
*Assistant Examiner* — Assres H Woldemaryam
(74) *Attorney, Agent, or Firm* — Lorenz & Kopf, LLP

(57) ABSTRACT

A high-lift trailing edge flap system for an aircraft wing unit is provided. In high-lift trailing edge flap system, the backward movement and the inclination of the trailing edge flap in the extended position are dissociated in order to allow for the incorporation of the actuating mechanism into the wing in the stowed position.

19 Claims, 3 Drawing Sheets

(56) References Cited

U.S. PATENT DOCUMENTS

| | | | | |
|---|---|---|---|---|
| 4,725,026 | A * | 2/1988 | Krafka | B64C 9/16 244/213 |
| 4,763,862 | A * | 8/1988 | Steinhauer | B64C 9/18 244/213 |
| 5,161,757 | A * | 11/1992 | Large | B64C 9/18 244/213 |
| 2007/0128026 | A1* | 6/2007 | Grandmaison | B64C 27/615 416/23 |
| 2011/0174921 | A1* | 7/2011 | Fervel | B64C 9/02 244/87 |
| 2011/0290946 | A1* | 12/2011 | Peirce | B64D 45/0005 244/213 |
| 2014/0145039 | A1* | 5/2014 | Beyer | B64C 9/10 244/215 |

\* cited by examiner

HIGH-LIFT TRAILING EDGE FLAP SYSTEM FOR AN AIRCRAFT WING UNIT

CROSS REFERENCE TO RELATED APPLICATION

This application claims priority to French Patent Application No. 13 59393 filed Sep. 30, 2013, which is incorporated herein by reference in its entirety.

TECHNICAL FIELD

The technical field relates to a high-lift flap system for the rear portion, in the vicinity of the trailing edge, of an aircraft wing.

BACKGROUND

It is known that in order to fly at low speed in complete safety, for example during take-off and landing, some aircraft, in particular commercial civil airplanes, have high-lift systems for altering their wing unit intended for cruising at high speed. The aim of these high-lift systems is to momentarily increase the surface area and camber of the wing profile of aircraft, also ensuring greater lift.

The high-lift systems used are basically leading edge slats, arranged in the front portion of a wing, and trailing edge flaps, fitted in the rear portion of said wing. These slats and flaps are movable under the action of an actuating mechanism allowing them to assume either a position in which they are stowed into the wing, or at least one extended position, which is set back and inclined relative to said wing.

As a general rule, the rotation that a leading edge slat undergoes between its stowed position and its extended position is very slight, meaning that the corresponding actuating mechanism can be simple and is easily fully stowable inside the wing in the stowed position.

By contrast, the rotation and the backwards movement that a trailing edge flap has to undergo between its stowed position and its extended position are considerable, resulting in a complex, heavy and voluminous actuating mechanism. These drawbacks are exacerbated by the fact that the actuating mechanisms of all the trailing edge flaps of a wing are generally driven, in a centralised manner, from a single drive shaft. In addition, in these known high-lift systems, a predetermined rotation of the trailing edge flap corresponds to an extended position.

On account of their large volume, these actuating mechanisms of the trailing edge flaps cannot be housed inside the wings and are arranged for the most part outside said wings, projecting from the lower surface of said wings, as shown in U.S. Pat. No. 4,471,928 for example. To limit the aerodynamic disturbances caused by these external actuating mechanisms, each mechanism is contained in a profiled fairing suspended below the lower surface of the corresponding wing. Despite this precautionary measure, the drag resulting from the presence of these profiled fairings remains significant, and this may impair aircraft performance. Furthermore, since the rotation of the trailing edge flap is linked to its extension, optimum aerodynamic effect of this flap is impossible.

It will be noted that U.S. Pat. No. 3,655,149 and EP 0 411 680 disclose trailing edge flap systems, housed in part in the wing bearing said flap and in part in said flap. However, in these known systems, the inclination of a trailing edge flap is controlled by the extension movement of said flap.

In addition, other objects, desirable features and characteristics will become apparent from the subsequent summary and detailed description, and the appended claims, taken in conjunction with the accompanying drawings and this background.

SUMMARY

In order to overcome these drawbacks, according to the various teachings of the present disclosure, a high-lift flap system for the rear portion of an aircraft wing is provided, which system comprises: a trailing edge flap provided with a leading edge, a trailing edge, an upper surface and a lower surface, and a mechanism for actuating said trailing edge flap, allowing said flap to assume: either a stowed position for which said trailing edge flap is housed at least in part in the rear portion of said wing, such that the upper surface and lower surface of said flap are continuously aerodynamic with respect to the upper surface and lower surface of said rear wing portion and that the trailing edge of said trailing edge flap forms a portion of the trailing edge of said rear wing portion, or at least one extended position for which said trailing edge flap is set back from the trailing edge of said wing and inclined relative thereto.

The actuating mechanism comprises: translation drive means, which are housed at least in part in the rear portion of said wing and which comprise at least one driven movable element, and rotation means, which are housed in said trailing edge flap and are connected to the movable element so as to be able to rotate said trailing edge flap relative to said movable element, about an axis parallel to the leading edge of said trailing edge flap.

The various teachings of the present disclosure are distinctive in that said rotation means are formed by a rotating actuator, of which the rotation shaft defines the axis of rotation of said trailing edge flap.

Thus, according to the various teachings of the present disclosure, the translation movement, moving the trailing edge flap from its stowed position to an extended position and vice versa is dissociated from the rotation movement for inclining the trailing edge flap in the extended position. Through dissociating the two types of movement in this manner, the present disclosure, while still making it possible to obtain a large backwards movement and a large pivot movement of the trailing edge flap, also allows for simple incorporation of the actuating mechanism of the trailing edge flap inside the rear portion of the wing and for independence of the rotation of the trailing edge flap, relative to the extension thereof. Thus, in the stowed position of the trailing edge flap, that is to say in high-speed cruise flight, the configuration of the wing is perfectly smooth (the above-mentioned fairings being redundant and thus dispensed with), which allows for significant gains in drag and thus in fuel consumption, whereas, when said trailing edge flap is in an extended position, any desired optimum rotation can be conferred thereon.

In one embodiment, according to the various teachings of the present disclosure, said translation drive means are capable of conferring on said trailing edge flap a plurality of different extended positions and, since operation of said translation drive means is independent of operation of said rotation means, at each extended position said rotation means can confer a plurality of different rotations on said trailing edge flap.

In addition, it will be noted that, unlike the centralised prior art set out above, the present disclosure allows for individual control of the trailing edge flaps of a wing. In this case, all of the actuating mechanisms of the trailing edge flaps of a wing are operated and synchronised by a computer and a monitoring channel having position sensors.

Said rotating actuator may be either electric or hydraulic. For ease of control and owing to the level of torque, it is advantageous for said actuator to be of the electro-hydraulic type, known in the art as the electric hydraulic actuator (EHA).

In one embodiment, said rotating actuator is arranged in the trailing edge flap in such a way that its axis of rotation is located at a distance from the leading edge of said trailing edge flap located between about 30% and about 40% and in one example, at approximately 35% of the chord length thereof. Indeed, in a known manner, it is in this region that the aerodynamic resultant of the profile of said flap is located, thereby minimising the torque to be supplied by the rotating actuator to actuate the trailing edge flap.

In one example, said rotating actuator and the movable element are joined by means of a lug which is rigidly connected to the rotation shaft of said actuator and is engaged in a recess in said movable element.

For ease of maintenance, it is advantageous for said rotating actuator to be arranged in a removable casing inserted in a corresponding housing of said trailing edge flap. In one example, when fixed in said housing, said removable housing contributes to the structural resistance of said trailing edge flap. In addition, said housing is advantageously accessible via an opening made in the upper surface of said trailing edge flap, and the top face of said removable casing is formed so as, when said casing is positioned in its housing, to seal said opening and to form the corresponding portion of said upper surface.

Thus, relative to the trailing edge flaps of the above-described prior art, the present disclosure has numerous advantages: very significant aerodynamic gain since dispensing with the lower surface fairings results in, on the one hand, an obvious decrease in drag and, on the other hand, an increase in lift through exposing lift zones; increase in adjustment options, since translation and rotation of the trailing edge flap are independent; greater freedom for the wing unit through doing away with the constraint of the trailing edge flaps sharing a drive shaft; increase in the extension speed of the trailing edge flap where necessary; gains in simplicity, weight and cost, since the parts used are simpler, fewer in number and more compact; better balance of the aerodynamic loads in high-lift mode, owing to the possibility for rapid closed-loop control; option of using larger backward movements and rotations of the trailing edge flap than necessary, so as to improve the high-lift performance of the aircraft as a whole; and option of using the trailing edge flaps for other purposes aside from lift augmentation, such as the use in air brakes by orienting said flaps upward.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figures 1A, 1B:
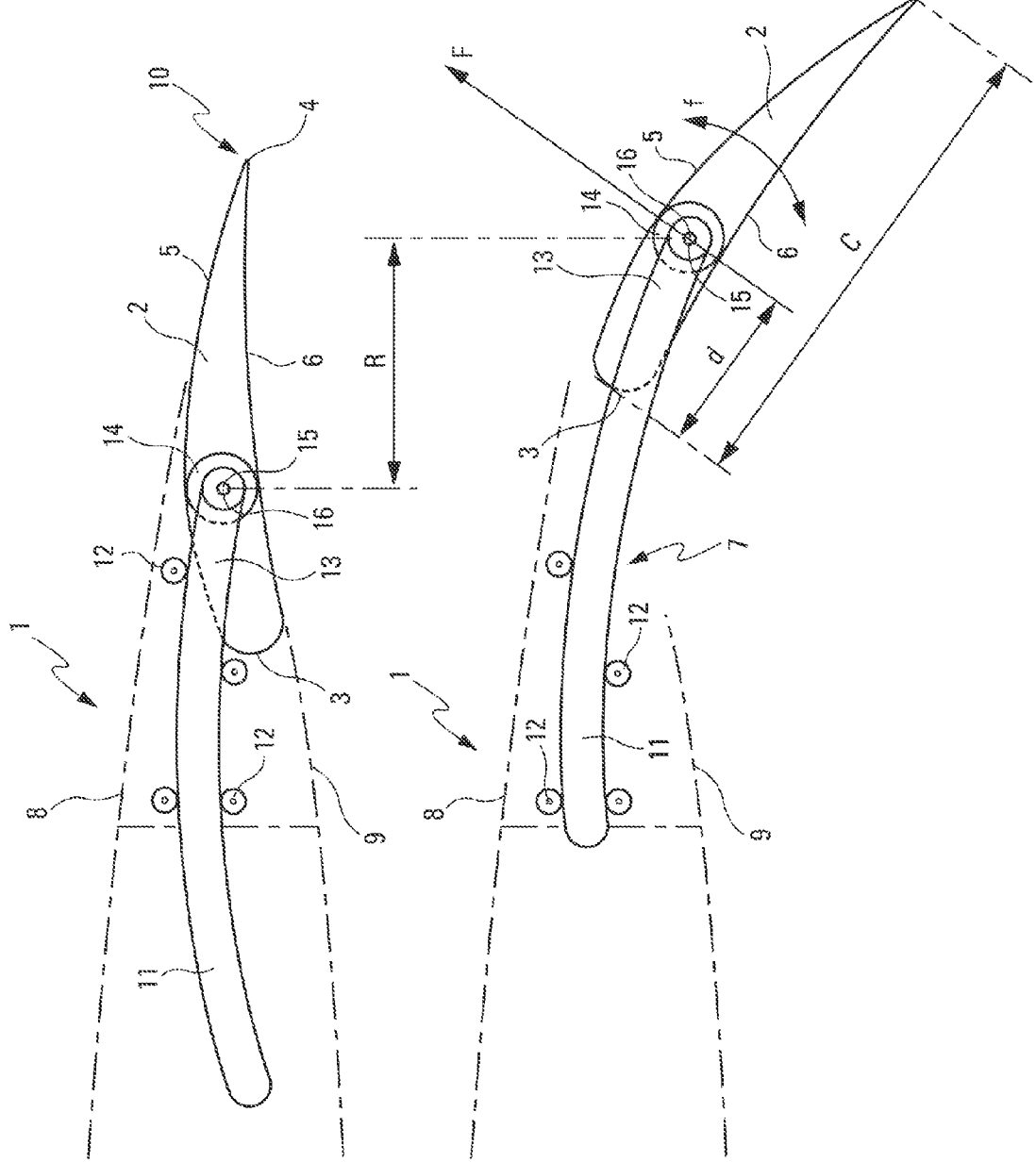
FIGS. 1A and 1B comprises two diagrams showing a side view of an embodiment of the present disclosure, with a trailing edge flap in a stowed and extended position respectively.

FIGS. 1A and 1B schematically shows the rear portion 1 of an aircraft wing provided with a high-lift flap system comprising a trailing edge flap 2.

The trailing edge flap 2 is an aerodynamic surface comprising a leading edge 3, a trailing edge 4, an upper surface 5 and a lower surface 6.

As shown in FIG. 1A and FIG. 1B, the trailing edge flap 2 can adopt: either a stowed position (FIG. 1A) for which the trailing edge flap 2 is housed in an undercut 7 (see FIG. 1B) in the rear wing portion 1, such that the upper surface 5 and the lower surface 6 of the trailing edge flap 2 are continuously aerodynamic with the upper surface 8 and the lower surface 9 of said rear wing portion 1 respectively, and that the trailing edge 4 of the trailing edge flap 2 forms a trailing edge portion 10 of said rear wing portion 1, or an extended position (FIG. 1B) for which said trailing edge flap 2 is set back from the trailing edge 10 of said rear wing portion 1 and inclined relative thereto.

To move the trailing edge flap 2 from its stowed position to its extended position and vice versa, the system shown schematically in FIGS. 1A and 1B comprises an actuating mechanism 11, 12, 14 composed of: translation drive means which are housed in the rear wing portion 1 and comprise at least one curved rail 11, guided and driven by drive wheels 12, which are themselves driven by one or more motors (not shown). The curved rail 11 can move within the undercut 7, towards the rear and the front of the rear wing portion 1. In its forwardmost position (FIG. 1A), which corresponds to the stowed position of the trailing edge flap 2, the curved rail is fully housed in the rear wing portion 1. By contrast, in its rearmost position (FIG. 1B), which corresponds to the extended position of the trailing edge flap 2, the curved rail 11 projects downward, outside the undercut 7. As can be seen by comparing FIGS. 1A and 1B, the curved rail 11 makes it possible to obtain, by means of curved translation, a significant backward movement R for the trailing edge flap 2. The actuating mechanism 11, 12, 14 also comprises rotation means 14, 15 comprising at least one rotating actuator 14 which is housed in the trailing edge flap 2 and is connected to the rear portion 13 (at the rear end in the embodiment shown) of the curved rail 11 so as to be able to rotate this flap, relative to the rail 11, about an axis 15 parallel to its leading edge 3 (see the double-headed arrow f). The rotating actuator 14 may be of the electro-hydraulic type, known in the art as an electric hydraulic actuator (EHA). For example, the rotating actuator 14 is a rotating EHA that generates significant torque while being more compact.

It can thus be seen that by controlling the drive wheels 12 and by controlling the rotating actuator 14, it is possible to move the trailing edge flap 2 having a length R backward (or forwards) and to confer thereon the desired inclination. Of course, it is possible to synchronise these two translation and rotation commands.

It will be readily understood that by controlling the wheels 12 and the curved rail 11 it is possible to confer on the trailing edge flap 2 a plurality of intermediate extended positions between the forward most position in FIG. 1A and the rearmost position in FIG. 1B and that, by controlling the rotating actuator 14, it is possible to make the trailing edge flap 2 rotate in a plurality of different ways at each of said intermediate extended positions. In addition, owing to the rotating actuator 14, the trailing edge flap 2 can be inclined upward or downward at each of said intermediate positions.

The rotation shaft 16 of the rotating actuator 14 defines the axis of rotation 15 of the trailing edge flap 2. As aforesaid, the rotating actuator 14 is arranged in the trailing edge flap 2 such that the axis of rotation 15 is located at a distance d from the leading edge 3 located between about 30% and about 40% and in one example, at approximately 35% of the chord length C of the profile of said flap 2, that is to say in the vicinity of the point of application of the resultant F of the aerodynamic forces exerted on the flap.

Figure 2:
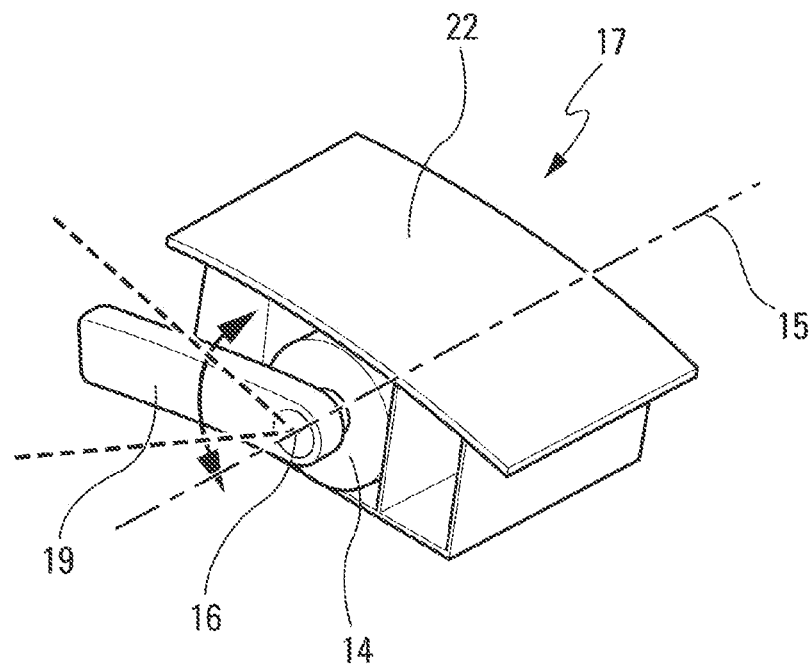
FIG. 2 is a perspective view of a casing containing a rotating actuator for actuating the trailing edge flap.
Figure 3:
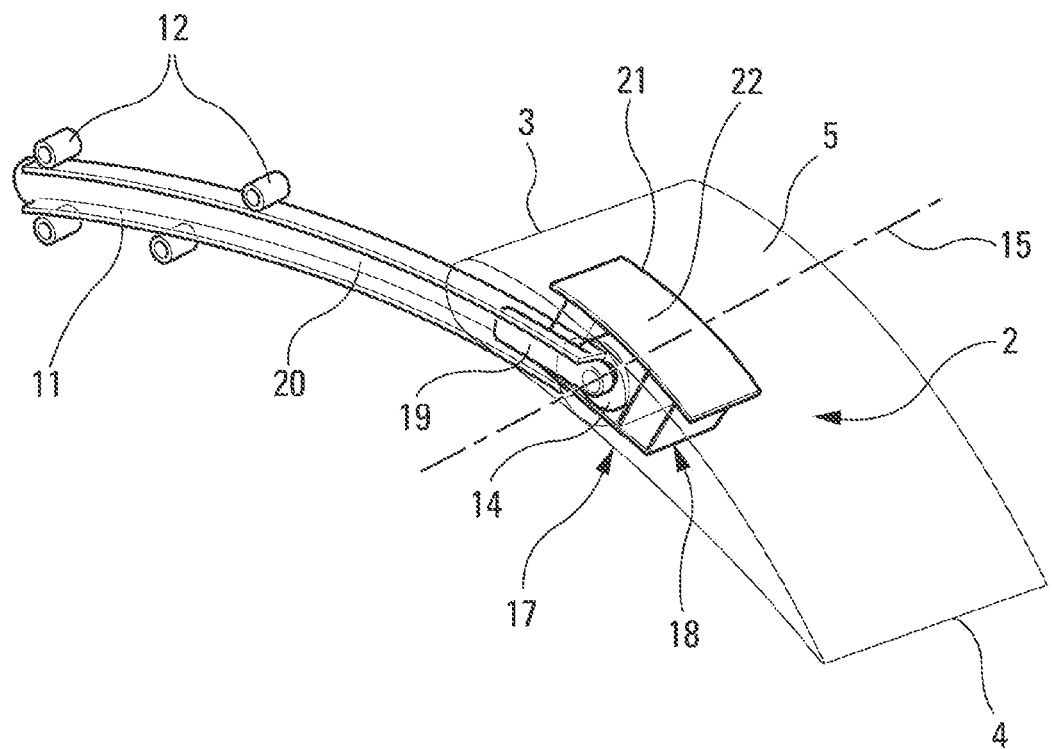
FIG. 3 is a perspective view of an embodiment of the system in FIGS. 1A and 1B, using the casing in FIG. 2.

In an embodiment of the present disclosure, shown in FIGS. 2 and 3, the rotating actuator 14 is arranged in a casing 17 that can be removably inserted in a corresponding housing 18 of said trailing edge flap 2.

A drive lug 19 orthogonal to the rotation shaft 16 of the rotating actuator 14 is connected for conjoint rotation to said shaft and engaged in a channel 20 in the movable element 11. Thus, when the rotating actuator 14 is actuated and its rotation shaft 16 rotates, the lug 19 is arrested relative to the movable element 11 and the trailing edge flap 2 rotates about the axis 15.

When, as shown in FIG. 3, the removable casing 17 is inserted and fixed in the housing 18 provided in the trailing edge flap 2 (said fixing being able to be carried out in any known manner (not shown)), said casing 17 contributes to the structural resistance of said flap.

In one example, the housing 18 for the casing 17 is accessible via an opening 21 made in the upper surface 5 of the trailing edge flap 2, and the top face 22 of the removable casing 17 is formed to seal the opening 21 in the upper surface 5 and to form the corresponding portion thereof when said casing is fixed in its housing 18 (FIG. 3).

Figure 4:
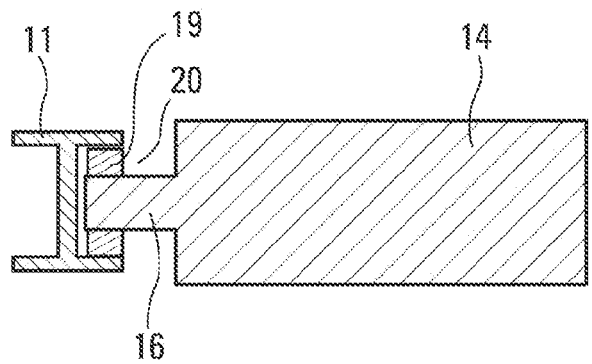
FIGS. 4 to 7 are schematic cross sections of various configurations of the system according to the present disclosure.
Figure 5:
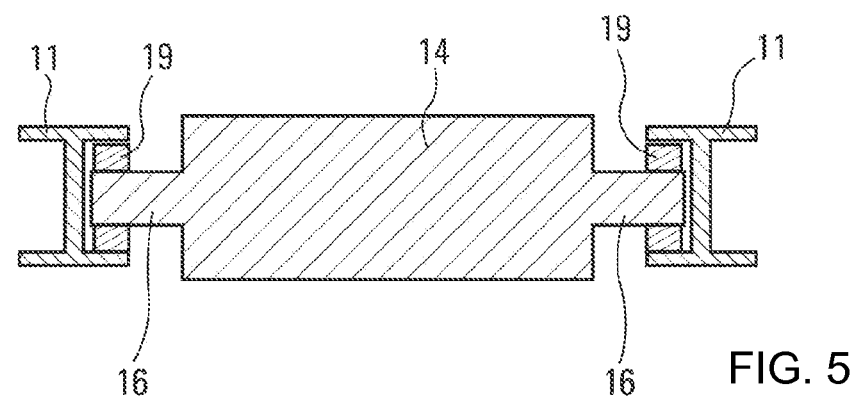
Figure 6:
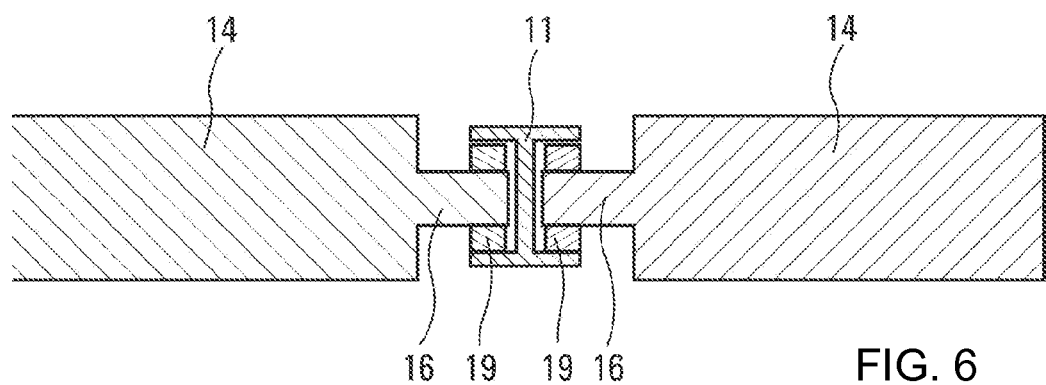
Figure 7:
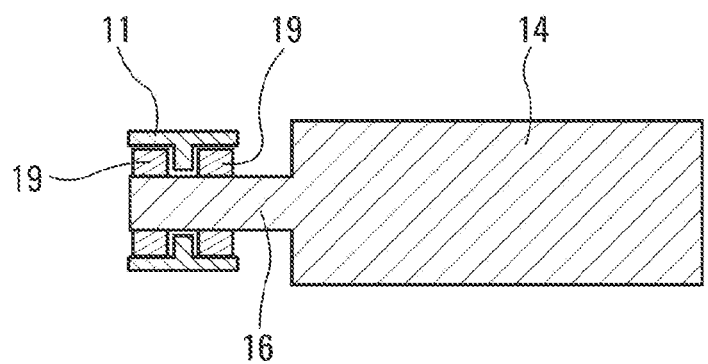

FIGS. 4 to 7 show schematic cross sections of various configurations of the system according to the various teachings of the present disclosure: FIG. 4 shows the system in FIG. 3; in FIG. 5 a movable rail 11 is provided on either side of the rotating actuator 14 so as to obtain more force with which to actuate the flap 2 and better balance of forces; in FIG. 6 just one movable rail 11 is provided for two adjacent flaps 2; and in FIG. 7 the shaft 16 bears two lugs 19 housed in recesses (channels) made in opposite faces of the movable rail 11.

Regardless of the embodiment of the system according to the teachings of present disclosure, it is advantageous, for rigidity reasons, for the movable rail(s) 11 to have an I-shaped profile.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A high-lift flap system for a rear portion of an aircraft wing, the high-lift flap system comprising:
   a trailing edge flap provided with a leading edge, a trailing edge, an upper surface and a lower surface, and
   a mechanism for actuating said trailing edge flap, allowing said trailing edge flap to assume either a stowed position for which said trailing edge flap is housed at least in part in the rear portion of the aircraft wing, such that the upper surface and lower surface of said trailing edge flap are continuously aerodynamic with respect to the upper surface and lower surface of said rear portion of the aircraft wing and that the trailing edge of said trailing edge flap forms a portion of a trailing edge of said rear portion of the aircraft wing, or at least one extended position for which said trailing edge flap is set back from the trailing edge of said rear portion of the aircraft wing and inclined relative to the rear portion of the aircraft wing, said mechanism for actuating said trailing edge flap including:
   one or more translation drive devices, which are housed at least in part in the rear portion of the aircraft wing and which comprise at least one driven movable element; and
   one or more rotation devices, which are housed in said trailing edge flap and are connected to the at least one driven movable element so as to be able to rotate said trailing edge flap relative to the at least one driven movable element, about an axis parallel to the leading edge of said trailing edge flap,
   wherein said rotation devices are formed by a rotating actuator, and the axis of rotation of said trailing edge flap corresponds to a rotation shaft of the rotation actuator.

2. The high-lift flap system according to claim 1, wherein the rotating actuator is of the electro-hydraulic (EHA) type.

3. The high-lift flap system according to claim 1, wherein said rotating actuator is arranged in the trailing edge flap in such a way that the axis of rotation of said trailing edge flap is located at a distance from the leading edge of the trailing edge flap between 30% and 40% of the chord length of said trailing edge flap.

4. The high-lift flap system according to claim 1, wherein said rotating actuator and the at least one driven movable element are joined by a lug which is connected for conjoint rotation to the rotation shaft of said rotating actuator and engaged in a recess in said at least one driven movable element.

5. The high-lift flap system according to claim 1, wherein said rotating actuator is arranged in a removable casing inserted in a corresponding housing of said trailing edge flap.

6. The high-lift flap system according to claim 5, wherein said removable casing contributes to the structural resistance of said trailing edge flap when said removable casing is inserted and fixed in said housing.

7. The high-lift flap system according to claim 5, wherein said housing is accessible via an opening made in the upper surface of said trailing edge flap, and a top face of said removable casing is formed in order to, when said removable casing is in place in the housing, seal said opening and form the corresponding portion of said upper surface of said trailing edge flap.

8. The high-lift flap system according to claim 1, wherein said at least one driven movable element of the translation drive devices comprises at least one curved rail, which is guided and driven by drive wheels.

9. The high-lift flap system according to claim 8, wherein said curved rail has an I-shaped cross section.

10. An aircraft, comprising:
at least one high-lift flap system having a trailing edge flap provided with a leading edge, a trailing edge, an upper surface and a lower surface, and a mechanism for actuating said trailing edge flap, allowing said trailing edge flap to assume either a stowed position for which said trailing edge flap is housed at least in part in the rear portion of the aircraft wing or at least one extended position for which said trailing edge flap is set back from a trailing edge of said rear portion of the aircraft wing and inclined relative to the rear portion of the aircraft wing, said mechanism for actuating said trailing edge flap including:
one or more translation drive devices, which are housed at least in part in the rear portion of the aircraft wing and which comprise at least one driven movable element; and
one or more rotation devices, which are housed in said trailing edge flap and are connected to the at least one driven movable element so as to be able to rotate said trailing edge flap relative to the at least one driven movable element, about an axis parallel to the leading edge of said trailing edge flap,
wherein said rotation devices are formed by a rotating actuator, and the axis of rotation of said trailing edge flap corresponds to a rotation shaft of the rotation actuator.

11. The high-lift flap system according to claim 1, wherein said rotating actuator is arranged in the trailing edge flap in such a way that the axis of rotation of said trailing edge flap is located at a distance from the leading edge of the trailing edge flap at approximately 35% of the chord length of said trailing edge flap.

12. The aircraft according to claim 10, wherein the rotating actuator is of the electro-hydraulic (EHA) type.

13. The aircraft according to claim 10, wherein said rotating actuator is arranged in the trailing edge flap in such a way that the axis of rotation of said trailing edge flap is located at a distance from the leading edge of the trailing edge flap between 30% and 40% of the chord length of said trailing edge flap.

14. The aircraft according to claim 10, wherein said rotating actuator and the at least one driven movable element are joined by a lug which is connected for conjoint rotation to the rotation shaft of said rotating actuator and engaged in a recess in said at least one driven movable element.

15. The aircraft according to claim 10, wherein said rotating actuator is arranged in a removable casing inserted in a corresponding housing of said trailing edge flap.

16. The aircraft according to claim 15, wherein said removable casing contributes to the structural resistance of said trailing edge flap when said removable casing is inserted and fixed in said housing.

17. The aircraft according to claim 15, wherein said housing is accessible via an opening made in the upper surface of said trailing edge flap, and a top face of said removable casing is formed in order to, when said removable casing is in place in the housing, seal said opening and form the corresponding portion of said upper surface of said trailing edge flap.

18. The aircraft according to claim 10, wherein said at least one driven movable element of the translation drive devices comprises at least one curved rail, which is guided and driven by drive wheels.

19. The aircraft according to claim 18, wherein said curved rail has an I-shaped cross section.

* * * * *